(12) United States Patent
Kim et al.

(10) Patent No.: US 7,499,109 B2
(45) Date of Patent: Mar. 3, 2009

(54) METHOD AND APPARATUS FOR RECEIVING DIGITAL TELEVISION SIGNALS USING SPACE DIVERSITY AND BEAM-FORMING

(75) Inventors: Min-Ho Kim, Suwon-si (KR);
Sung-Hoon Moon, Daegu-si (KR);
Dong-Seog Han, Daegu-si (KR);
Hae-Sock Oh, Daegu-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 877 days.

(21) Appl. No.: 10/845,308

(22) Filed: May 14, 2004

(65) Prior Publication Data
US 2005/0024540 A1    Feb. 3, 2005

(30) Foreign Application Priority Data
Jul. 30, 2003   (KR) ............... 10-2003-0052617

(51) Int. Cl.
*H04N 5/21* (2006.01)
(52) U.S. Cl. ..................... 348/614; 348/607
(58) Field of Classification Search ........... 348/614, 348/607, 624, 725, 726, 727; 375/346, 349, 375/286; *H04N 5/21, 5/44*
See application file for complete search history.

(56) References Cited

U.S. PATENT DOCUMENTS

| | | | | |
|---|---|---|---|---|
| 5,621,752 A | * | 4/1997 | Antonio et al. | 375/144 |
| 6,157,685 A | * | 12/2000 | Tanaka et al. | 375/346 |
| 6,946,993 B2 | * | 9/2005 | Seo et al. | 455/133 |
| 7,148,845 B2 | * | 12/2006 | Rooyen et al. | 342/377 |
| 7,184,506 B2 | * | 2/2007 | Kolze | 375/371 |
| 7,286,855 B2 | * | 10/2007 | Raleigh et al. | 455/562.1 |
| 2002/0163593 A1 | | 11/2002 | Liu et al. | |

FOREIGN PATENT DOCUMENTS

JP          11088245        3/1999
KR   10-2003-0055642        7/2003

OTHER PUBLICATIONS

Chinese Patent Office Action dated Jul. 13, 2007, for corresponding Chinese Patent Application No. 200410055618.4.
Wan Bin, Zhong Rupeng and Song Rongfang, "2D—Rake Receiver and Third Generation Mobile Communications System", Communications Technology, No. 8, 2002, pp. 69-71, China Academic Journal Electronic Publishing House.
Korean Office Action dated Sep. 29, 2005, for Korean Application No. 10-2003-0052617, with English Translation.

* cited by examiner

*Primary Examiner*—Sherrie Hsia
(74) *Attorney, Agent, or Firm*—Harness, Dickey & Pierce, P.L.C.

(57) ABSTRACT

A receiver that receives radio signals, and a method for the same. The radio signals may be received by a plurality of antennas and then demodulated by respective converter devices, an estimated channel device estimates a channel for at least one antenna and at least one beam-forming device performs beam-forming on a selected main path signal from among the demodulated incident data signals. The output signals from the at least one beam-forming device are combined. The method of receiving the incident data signals may be accomplished by using space diversity.

23 Claims, 8 Drawing Sheets

METHOD AND APPARATUS FOR RECEIVING DIGITAL TELEVISION SIGNALS USING SPACE DIVERSITY AND BEAM-FORMING

CROSS-REFERENCE TO RELATED APPLICATION

This application claims the benefit of priority of Korean Patent Application No. 2003-52617, filed on Jul. 30, 2003, in the Korean Intellectual Property Office, the disclosure of which is incorporated herein in its entirety by reference.

BACKGROUND OF THE INVENTION

1. Field of the Invention

The present invention relates to a radio receiver and more particularly, to a method and an apparatus for receiving digital TV signals using space diversity and at least one beam-former device.

2. Description of the Related Art

Conventional digital TV signals are subject to multi-path signaling occurring, often due to buildings, walls, and clouds. When receiving digital TV signals, the multi-path effect may result in echoes of the same received digital TV signals. In a digital TV receiver, such echoes are manifested as signal noise. These echoes resulting from the multi-path effect, have a strong influence on the quality of the received digital TV signals. The Advanced Television System Committee (ATSC) standard A53 is a standard for conventional digital TV receivers.

SUMMARY OF THE INVENTION

Exemplary embodiments of the present invention provide a receiver for receiving incident radio signals including at least one beam-forming device for beam-forming a selected main path signal and a channel estimation device for estimating a channel for at least one antenna of the receiver.

An exemplary embodiment of the present invention provides a method for receiving digital TV signals including receiving a plurality of incident data signals at a plurality of antennas including demodulating the incident data signals received by each of the plurality of antennas, estimating a channel for at least one antenna in response to the demodulated incident data signals, selecting a main path signal from among the demodulated incident data signals and performing beam-forming on the selected main path signal, and combining the beam-formed selected main path signal with the demodulated incident data signals to form an output signal.

In exemplary embodiments, the method of receiving a plurality of incident data signals includes removing at least one multi-path signal included in the combined output signal.

In exemplary embodiments, the method of receiving a plurality of incident data signals includes estimating a channel based on the output signal of at least one beam-former.

In exemplary embodiments, the method of receiving a plurality of incident data signals includes performing beam-forming based on a field synchronization signal of a data frame contained in the selected main path signal and by using a training sequence.

Another exemplary embodiment of the present invention provides a method for receiving incident data signals using space diversity, demodulating the incident data signals estimating a channel for each of a plurality of beam-formers using the demodulated incident data signals and output signals of the plurality of beam-formers, selecting a main path signal from among the demodulated incident data signals, applying a weight and performing beam-forming on the selected main path signal, and delaying each of the output signals of the plurality of beam-formers by a delay time and combining the delayed output signals.

Another exemplary embodiment of the present invention provides a receiver including a plurality of beam-formers comprising a plurality of converters which convert received radio signals to baseband signals, a channel estimator which receives the output of the converters and the output of the beam-formers and estimates a channel for each of a corresponding plurality of antennas, at least one controller which receives the output of the beam-formers and delays the output signals by a predetermined delay time in response to the control signal, and an adder which combines the output of the at least one controller.

In exemplary embodiments, the channel estimator estimates the channel using a field synchronization signal of a data frame contained in each of the output signals of the beam-formers and output signals of the converters.

In exemplary embodiments, the receiver further comprises an equalizer which receives an output signal of the adder and removes multi-path signals to form the radio signals.

Another exemplary embodiment of the present invention provides a storing circuit for storing weights, an adder for summing the output of the storing circuit, a memory device for storing a training sequence, a subtractor for calculating the difference between the training sequence and output of the adder, and an adaptive weight controller for independently controlling weights in response to the output of the subtractor.

Another exemplary embodiment of the present invention provides a receiver for receiving radio signals comprising a converter which converts the received radio signals into baseband signals, a plurality of beam-formers which receive the baseband signals of the converter, a channel estimator which receives the baseband signals of the converter and the output signals of the plurality of beam-formers and estimates a channel for each of the radio signals, a control circuit which receives the output signals of the plurality of beam-formers and independently controls a delay time of each of the output signals of the beam-formers based on channel estimation results of the channel estimator and an adder, which combines the output signals of the control circuit.

In exemplary embodiments, the receiver includes an equalizer which receives an output signal of the adder and removes multi-path signals to form the intended radio signals.

Another exemplary embodiment of the present invention provides a receiver including a plurality of beam-formers which perform beam-forming on a selected main path signal in response to a field synchronization signal of a data frame of the selected main path signal, the main path signal being selected from a plurality of demodulated incident data signals received and sent through an estimated channel, and an equalizer which removes the multi-path signals from the received incident data signals. Another exemplary embodiment of the present invention provides at least one beam-forming device configured to receive a plurality of demodulated incident data signals and select a main path signal having a better channel characteristic from among the plurality of demodulated incident signals, and perform beam-forming on the selected main path signal.

Another exemplary embodiment of the present invention provides a channel estimator device configured to receive a plurality of incident data signals, received by a plurality of antennas, and at least one output signal from at least one beam-forming device, and estimate a channel for at least one of the plurality of antennas, and send a control signal to a control circuit of the at least one beam-forming device, where the control signal includes timing and/or gain information.

Another exemplary embodiment of the present invention provides a channel estimator device configured to receive a plurality of incident data signals, received by a plurality of antennas, and at least one output signal from at least one beam-forming device, and estimate a channel for at least one of the plurality of antennas, and send a control signal to a control circuit of the at least one beam-forming device, where the control signal includes timing and/or gain information, and at least one beam-forming device configured to receive the plurality of demodulated incident signals, and select a main path signal having a better channel characteristic from among the plurality of demodulated incident signals and perform beam-forming on the selected main path signal.

BRIEF DESCRIPTION OF THE DRAWINGS

Various features of the present invention will become readily apparent from the description of the exemplary embodiments that follow, with reference to the attached drawings in which.

DETAILED DESCRIPTION OF THE INVENTION

Exemplary embodiments of the present invention will now be described more fully with reference to the attached drawings, in which exemplary embodiments of the invention are shown.

Figure 1:
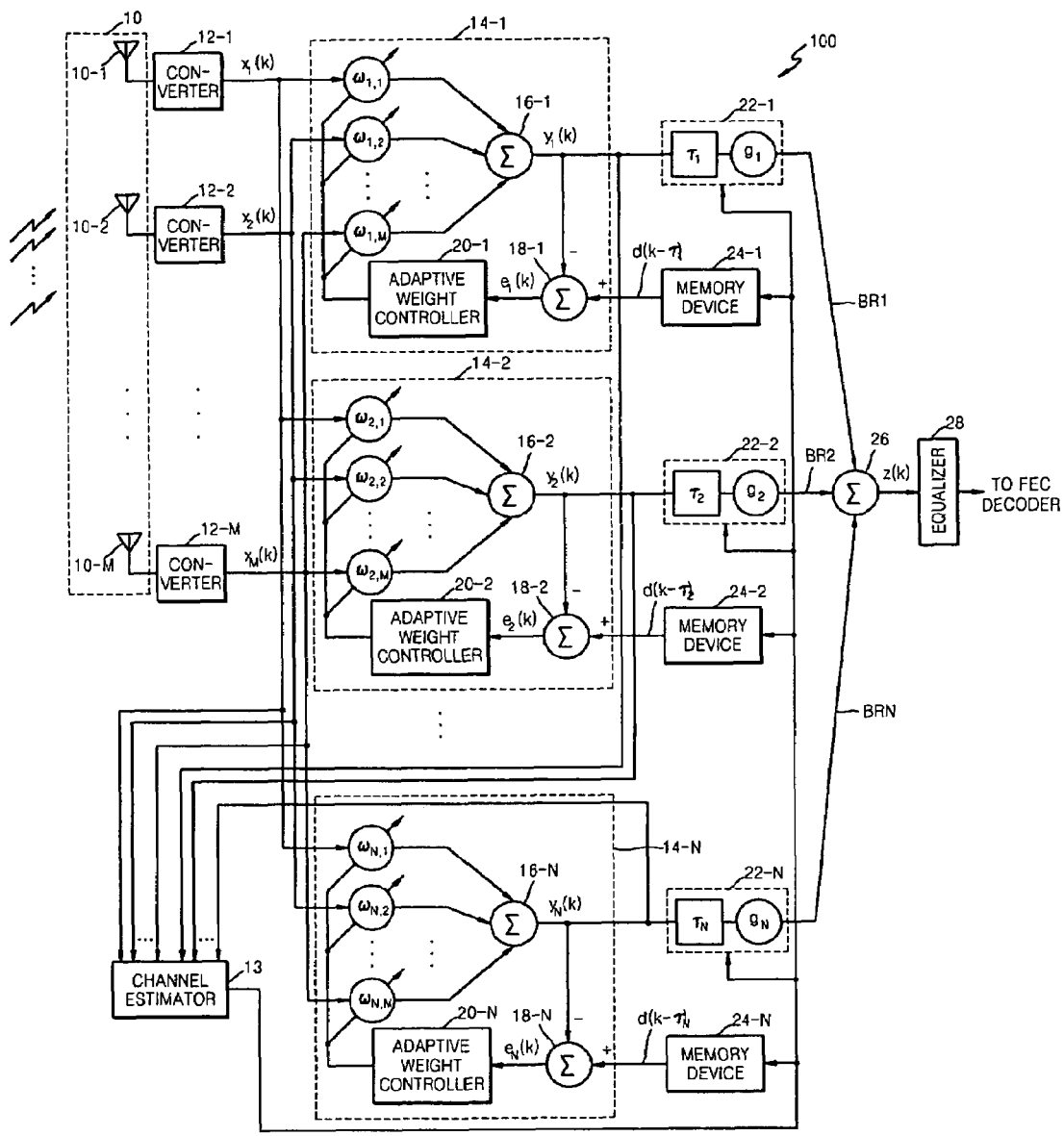
FIG. 1 is a diagram of a digital TV receiver according to an exemplary embodiment of the present invention.

FIG. 1 is a diagram of a digital TV receiver according to an exemplary embodiment of the present invention. Referring to FIG. 1, a receiver 100 includes an antenna array 10, a plurality of converters 12-1, 12-2, ..., 12-M (M is a natural number), a channel estimator 13, a plurality of beam-formers 14-1, 14-2, ..., 14-N (N is a natural number), a plurality of control circuits 22-1, 22-2, ..., 22-N, a plurality of memory devices 24-1, 24-2, ..., 24-N, an adder 26, and an equalizer 28.

The antenna array 10 includes a plurality of antenna elements 10-1, 10-2, ..., 10-M for receiving incident data signals, by using space diversity. Each of the antenna elements 10-1, 10-2, ..., 10-M receives N (a variable number) incident data signals, e.g., radio TV signals.

Each of the converters 12-1, 12-2, ..., 12-M receives the radio signals outputted from the corresponding antenna elements 10-1, 10-2, ..., 10-M. The converters then convert the received radio signals into demodulated incident data signals, e.g., baseband signals. Each of the converters 12-1, 12-2, ..., 12-M has tuning and demodulation functions.

The resulting incident data signals may be represented by a received radio signal vector x(k) of the antenna array 10 expressed as follows:

$$x(k) = [x_1(k), x_2(k), \ldots, x_m(k)]^T \quad (1),$$

where $X_m(k)$ represents the received radio signals of an $m^{th}$ antenna element, m ranges from 1 to M, and the superscript T represents the transpose of a vector or matrix.

To simplify a channel model of the receiver 100 according to an exemplary embodiment of the present invention, it is assumed that L radio signals are input to each of the antenna elements 10-1, 10-2, ..., 10-M (L is a natural number). Each of the L radio signals includes one main path signal and a plurality of multi-path signals. The main path signal may be selected as a result of comparing at least one level of the demodulated incident data signals, such as the "BEFORE BEAMFORMING" amplitude levels of FIG. 4C or 4D, with a reference level. Letting the main path signal be $s(k-\tau_1)$ and letting each of the multi-path signals be $s(k-\tau_l)$, where $2 \leq l \leq L$, the received radio signal vector x(k) of the antenna array 10 is expressed as follows:

$$x(k) = \sum_{l=1}^{L} a_l(\theta_l) s(k - \tau_1) + n(k), \quad (2)$$

where $\theta_l$ represents an incidence angle of the $l^{th}$ multi-path signal $s(k-\tau_1)$, and $a_l(\theta_l)$ represents a response vector of the antenna array 10. The response vector $a_l(\theta_l)$ is a parameter indicating information on phase differences among the antenna elements 10-1, 10-2, ..., 10-M, where such information is determined by incidence angles of incident signals received by the antenna elements 10-1, 10-2, ..., 10-M.

For example, if a wavelength of the incident signals received by the antenna elements 10-1, 10-2, ..., 10-M is $\lambda$, and the antenna elements 10-1, 10-2, ..., 10-M are disposed at intervals of D, the response vector $a_l(\theta_l)$ is expressed as follows:

$$a_1 \theta_1 = \left[ \exp\left( j \frac{2\pi D \sin \theta_1}{\lambda} \right) \ldots \exp\left( j \frac{2\pi (M-1) D \sin \theta_1}{\lambda} \right) \right]^T \quad (3)$$

The channel estimator 13 receives output signals $x_1(k)$, $x_2(k)$, ..., $x_M(k)$ of the plurality of converters 12-1, 12-2, ..., 12-M and/or output signals $y_1(k), y_2(k), \ldots, y_N(k)$ of the plurality of beam-formers 14-1, 14-2, ..., 14-N, estimates channels for each of the antenna elements 10-1, 10-2, ..., 10-M using field synchronization signals of data frames of received signals, and outputs control signals for independently controlling the control circuits 22-1, 22-2, ..., 22-N and the memory devices 24-1, 24-2, ..., 24-N.

Below are brief explanations of a channel estimation method of the channel estimator 13 and the operation of the receiver 100 according to the channel estimation method.

First, the channel estimator 13 estimates channels for omni-directional incident signals using one of the output signals $x_1(k), x_2(k), \ldots, x_M(k)$ of the plurality of converters 12-1, 12-2, ..., 12-M. Each of the antenna elements 10-1, 10-2, ..., 10-M has no directivity and is an omni-directional antenna. To select an output signal of a beam-former having the best channel characteristic from among output signals of the beam-formers 14-1, 14-2, ..., 14-N, when superior channel characteristics can be obtained with a specific direction of orientation, the channel estimator 13 outputs a corresponding control signal to the control circuits 22-1, 22-2, ..., 22-N, which control delay times $\tau_1, \tau_2, ..., \tau_N$ and/or weights, e.g., gains $g_1, g_2, ..., g_N$ in response to the corresponding control signal. For example, when it is desired to output only the output signal $y_1(k)$ of the first beam-former 14-1 to the adder 26, the gain $g_1$ of the control circuit 22-1 is set to 1 in response to its corresponding control signal, and the gains $g_2, ..., g_N$ of the other control circuits 22-2, ..., 22-N are set to 0 in response to their corresponding control signal.

Second, the channel estimator 13 estimates channels for the antenna elements 10-1, 10-2, ..., 10-M using the output signals $y_1(k), y_2(k), ..., y_N(k)$ of the plurality of beam-formers 14-1, 14-2, ..., 14-N, and outputs corresponding control signals for controlling the control circuits 22-1, 22-2, ..., 22-N and the memory devices 24-1, 24-2, ..., 24-N. The channel estimator 13 can estimate channel characteristics in a specific direction of orientation. In this case, channel estimation is performed using the field synchronization signals of data frames of the output signals $y_1(k), y_2(k), ..., y_N(k)$ of the plurality of beam-formers 14-1, 14-2, ..., 14-N. For example, the channel estimator 13 selects an output signal of at least one beam-former having superior channel characteristics from among the output signals $y_1(k), y_2(k), ..., y_N(k)$ of the plurality of beam-formers 14-1, 14-2, ..., 14-N, and outputs a corresponding control signal to the control circuits for controlling the delay time and gain of the selected output signal of at least one beam-former. The selected output signal of the at least one beam-former is delayed by a corresponding delay element represented by a corresponding delay time $\tau_1, \tau_2, ..., $ or $\tau_N$. The delay time $\tau_1, \tau_2, ..., \tau_N$ of the delay elements are controlled in response to the control signals in order to keep the output signals of the control circuits 22-1, 22-2, ..., 22-N in phase.

Third, the channel estimator 13 estimates channels for corresponding antenna elements 10-1, 10-2, ..., 10-M, simultaneously, using all of the output signals $x_1(k), x_2(k), ..., x_M(k)$ of the plurality of converters 12-1, 12-2, ..., 12-M. In this case, the channel estimator 13 can estimate incidence angles and powers of N radio signals input to each of the antenna elements 10-1, 10-2, ..., 10-M using algorithms such as MUSIC, ESPRIT, Delay and Sum, or Capon. If a plurality of multi-path signals whose number is more than a predetermined threshold are present in delay profile characteristics of the estimated channels, each of the beam-formers 14-1, 14-2, ..., 14-N will independently perform beam-forming for each of the multi-path signals. In response to the corresponding control signals, each of the control circuits 22-1, 22-2, ..., 22-N receives output signals of the beam-formers 14-1, 14-2, ..., 14-N that perform beam-forming independently in response to the corresponding control signal, controls the delay times and/or gains of the received signals, and outputs the resulting signals to the adder 26.

Each of the beam-formers 14-1, 14-2, ..., 14-N receives output signals of the converters 12-1, 12-2, ..., 12-M and includes a storing circuit for storing weights, an adder 16-1, 16-2, ..., or 16-N, a subtractor 18-1, 18-2, ..., or 18-N, and an adaptive weight controller 20-1, 20-2, ..., or 20-N. Each of the beam-formers 14-1, 14-2, ..., 14-N selects the main path signal from among the baseband signals sent through the estimated channels and performs beam-forming on the selected main path signal.

As a result of the channel estimation operation, if the number of multi-path signals having more power than a predetermined threshold is more than L, the operation of each of the beam-formers 14-1, 14-2, ..., 14-N is as follows.

The first beam-former 14-1 performs beam-forming on the multi-path signal $s(k-\tau_1)$ having the greatest power among the output signals of the beam-formers 14-1, 14-2, ..., 14-N, and performs spatial-filtering on the remaining output signals of the beam-formers 14-1, 14-2, ..., 14-N.

A weight vector $w_1(k)$ is expressed as follows:

$$w_1(k) = [w_{1,1}(k), w_{1,2}(k), ..., w_{1,M}(k)]^T \quad (4)$$

The output signal of the beam-former 14-1, obtained by combining the vector $x(k)$ of the received radio signals of Equation 1 and the weight vector $w_1(k)$, is expressed as follows:

$$y_1(k) = w_1^H(k)x(k) = \sum_{m=1}^{M} w_{1,m}^*(k)x_m(k), \quad (5)$$

where H represents Hermitian and * represents a complex conjugate.

Figure 2:
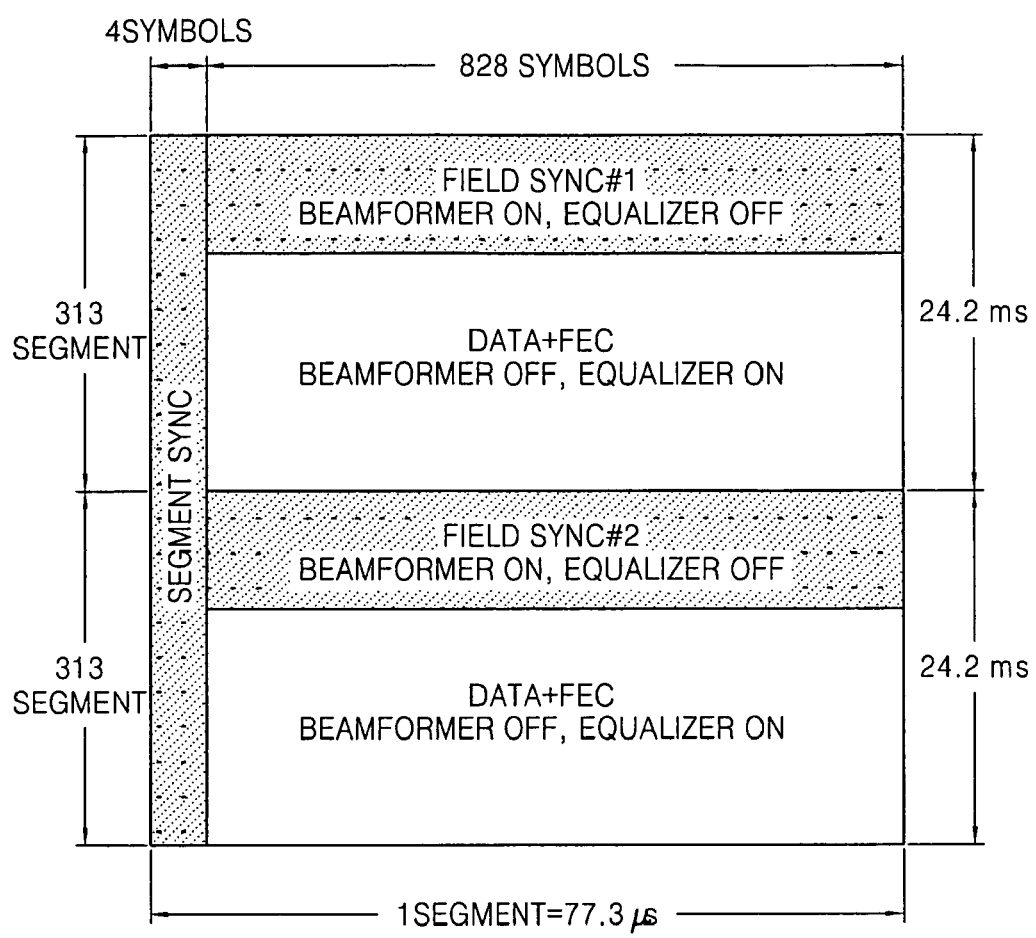
FIG. 2 illustrates data frames for controlling the operation of the digital TV receiver according to an exemplary embodiment of the present invention.

Each of the beam-formers 14-1, 14-2, ..., 14-N carries out beam-forming using a field synchronization signal (Field Sync.#N) and a segment synchronization signal (Segment Sync) of a data frame shown as in FIG. 2. Each of the beam-formers 14-1, 14-2, ..., 14-N carries out beam-forming using a least mean square (LMS) algorithm only when receiving known data in accordance with ATSC standard A53, yet does not perform beam-forming during an actual payload data period, which prevents beam-forming caused by channel estimation errors.

Assuming that a training sequence signal is represented by $d(k)$, an error signal $e(k)$ output from the subtractor 18-1 is expressed as follows:

$$e_1(k) = d(k-\tau_1) - y_1(k) \quad (6),$$

where $\tau_1$ represents a delay time of a multi-path signal $(s(k-\tau_1))$ obtained using channel estimation and $y_1(k)$ represents the output signal of the beam-former 14-1.

The adaptive weight controller 20-1 receives the error signal $e_1(k)$ output from the subtractor 18-1 and outputs a control signal for updating weights stored in the storing circuit. The storing circuit updates stored weights in response to the control signal. A weight vector $w_1(k+1)$ is expressed as follows:

$$w_1(k+1) = w_1(k) - \beta_1 e_1^*(k)x(k) \quad (7),$$

where $\beta_1$ represents a step size, which is a factor in determining convergence speed. As the step size increases, the convergence speed, i.e., the speed at which the channel estimation error is minimized, increases. Conversely, as the step size decreases, the convergence speed decreases. However, when the step size is too large, the LMS algorithm may diverge, and when the step size is too small, the LMS algorithm may not converge completely. Thus, setting a proper step size is required.

The other beam-formers 14-2 through 14-N perform beam-forming in the same fashion as the beam-former 14-1. Therefore, the output signal of the $n^{th}$ beam-former is expressed as follows:

$$y_n(k) = w_n^H(k)x(k) = \sum_{m=1}^{M} w_{n,m}^*(k)x_m(k), \quad n = 1, 2, ..., N, \quad (8)$$

where $w_n$ denotes the weight vector of the $n^{th}$ beam-former. The weight vector $w_n(k+1)$ of each of the beam-formers updated by the adaptive weight controller 20-1, 20-2, ..., 20-N is expressed as below:

$$w_n(k+1) = w_n(k) - \beta_n e_n^*(k) x(k), n=1, 2, \ldots N \quad (9)$$

The error signal of the $n^{th}$ beam-former is expressed as follows:

$$e_n(k) = d(k-\tau_n) - y_n(k) \quad (10),$$

where $\tau_n$ denotes a delay time of a signal that the $n^{th}$ beam-former desires to receive.

Each of the control circuits 22-1, 22-2, ..., 22-N receives the output signal of the corresponding beam-former and controls the delay time and/or gain of the output signal in response to the corresponding control signal. Thus, the output signals of the control circuits 22-1, 22-2, ..., 22-N can be in phase.

Each of the memory devices 24-1, 24-2, ..., 24-N stores a corresponding training sequence, detects each amplitude, position, and the number of the multi-path signals in response to the control signal output from the channel estimator 13, and outputs corresponding training sequences $d(k-\tau_N)$ having delay times corresponding to the detection results of the subtractors 18-1, 18-2, ..., 18-N.

The adder 26 receives the output signals of the control circuits 22-1, 22-2, ..., 22-N and combines them as follows:

$$z(k) = \sum_{n=1}^{N} g_n y_n(k + \tau_n), \quad (11)$$

where $g_n$ denotes a weight used for space diversity combining. The adder 26 combines the output signals of the control circuits 22-1, 22-2, ..., 22-N using selective combining, maximal ratio combining, equal gain combining, or feedback combining.

The equalizer 28 receives the output signal of the adder 26, removes the multi-path signals, and outputs the result to a forward error correction (FEC) decoder (not shown).

FIG. 2 illustrates data frames for controlling the operation of the receiver 100 according to an embodiment of the present invention. Each of the data frames shown in FIG. 2 is formed with two data fields in accordance with the ATSC standard A53. Each of the two data fields includes 313 data segments. The first data segment of each data field is a unique synchronization signal (field synchronization signal (Field Sync. #1)) and includes a training sequence used in the equalizer 28 of the receiver 100 shown in FIG. 1. Each data segment is comprised of 832 symbols (828 for the main segment portion and 4 for the segment sync. Portion). Each of the beam-formers 14-1, 14-2, ..., 14-N is turned on in response to the field synchronization signal (Field Sync. #1 or Field Sync. #2), and the equalizer 28 is turned on only during the period of a payload data portion of a data segment.

Figure 3A:
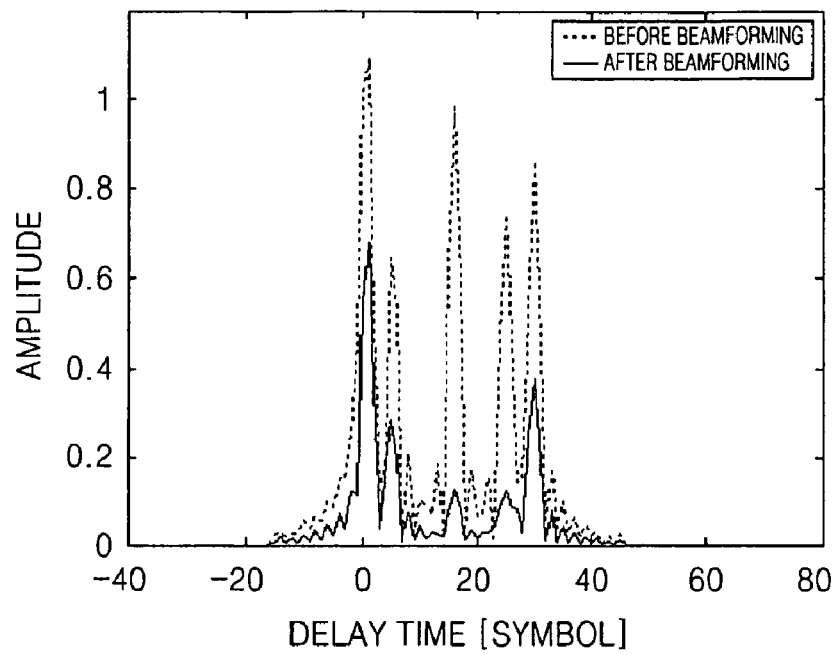
FIGS. 3A-3D includes exemplary characteristics of a Brazil C channel when using conventional beam-forming.
Figure 3B:
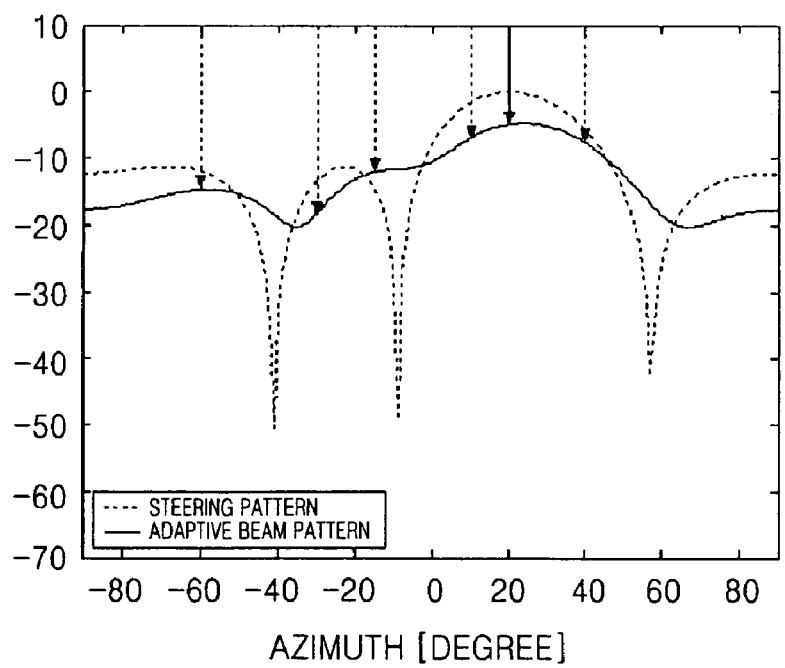
Figure 3C:
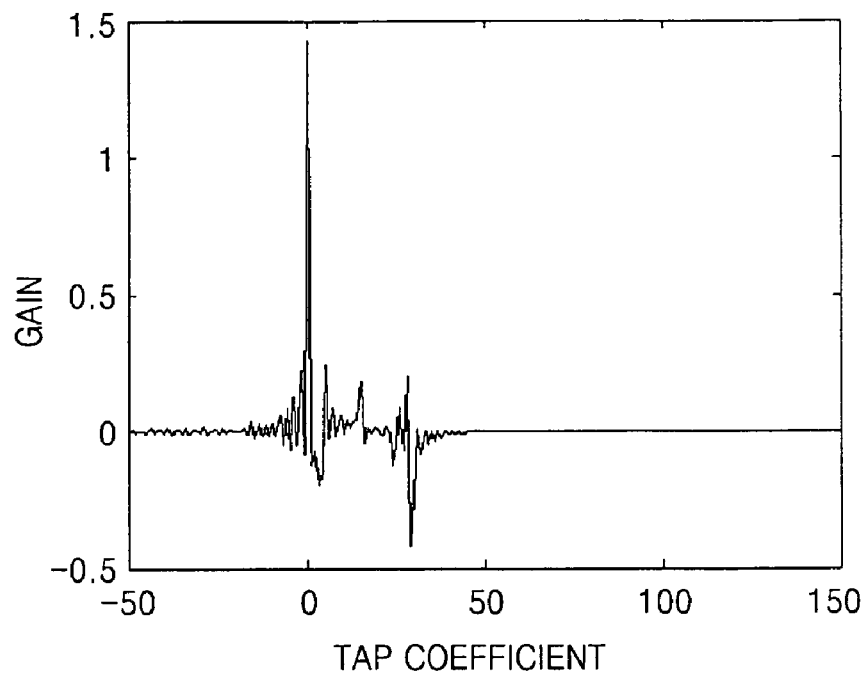
Figure 3D:
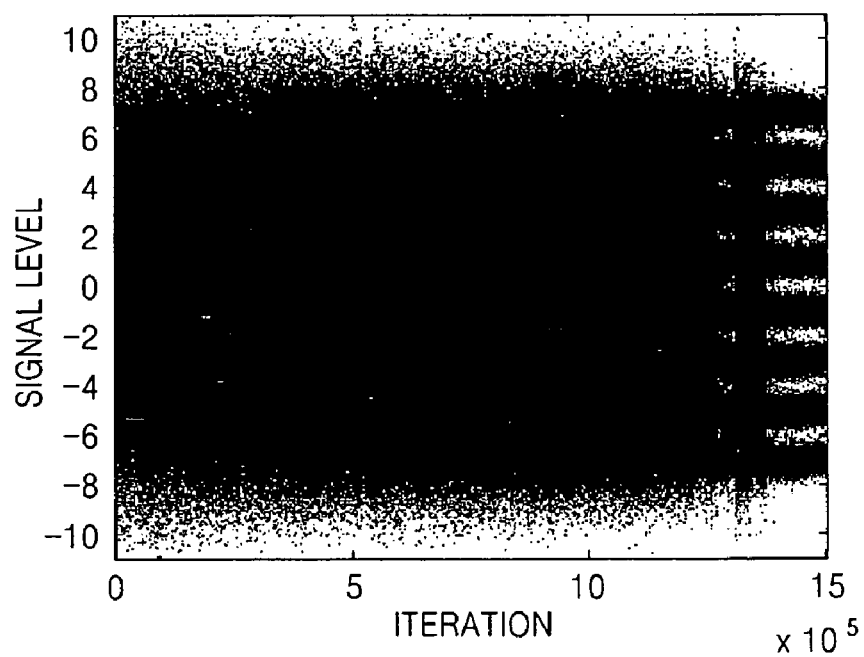

FIGS. 3A-3D show characteristics of a Brazil C channel when using conventional beam-forming. FIG. 3A illustrates channel characteristics before and after beam-forming. Referring to FIG. 3A, a solid line represents a channel characteristic after beam-forming, and a dotted line represents a channel characteristic before beam-forming. FIG. 3B illustrates a beam pattern of a beam-former. Referring to FIG. 3B, a solid line represents an adaptive beam pattern and a dotted line represents a steering pattern. FIG. 3C shows the relationship between a tap coefficient and a gain of a equalizer 28 after convergence. FIG. 3D shows an output property of a conventional equalizer by plotting signal level versus iterations.

Figure 4A:
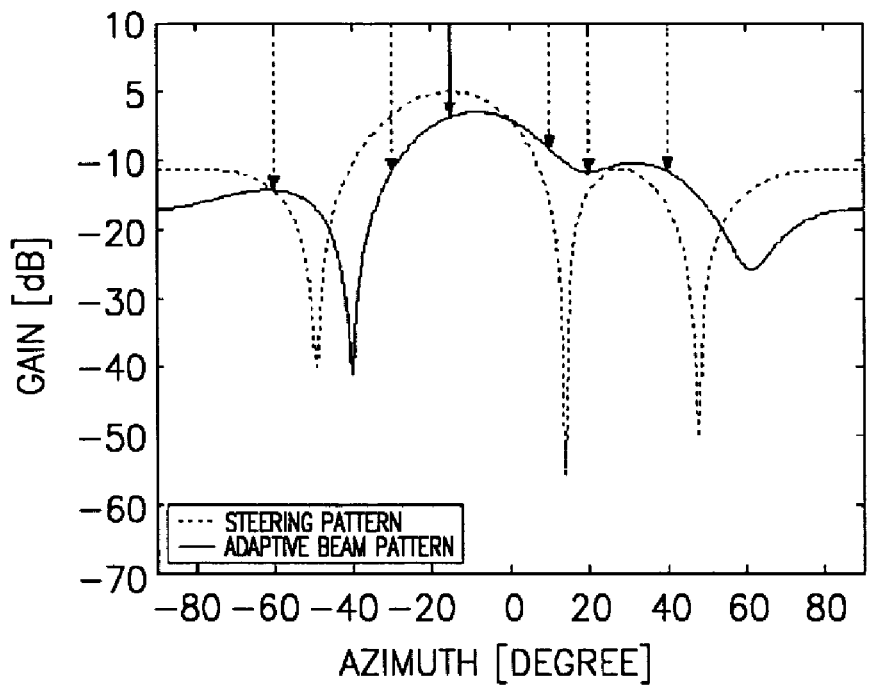
FIGS. 4A-4F includes exemplary characteristics of a Brazil C channel when using space diversity according to an exemplary embodiment of the present invention.
Figure 4B:
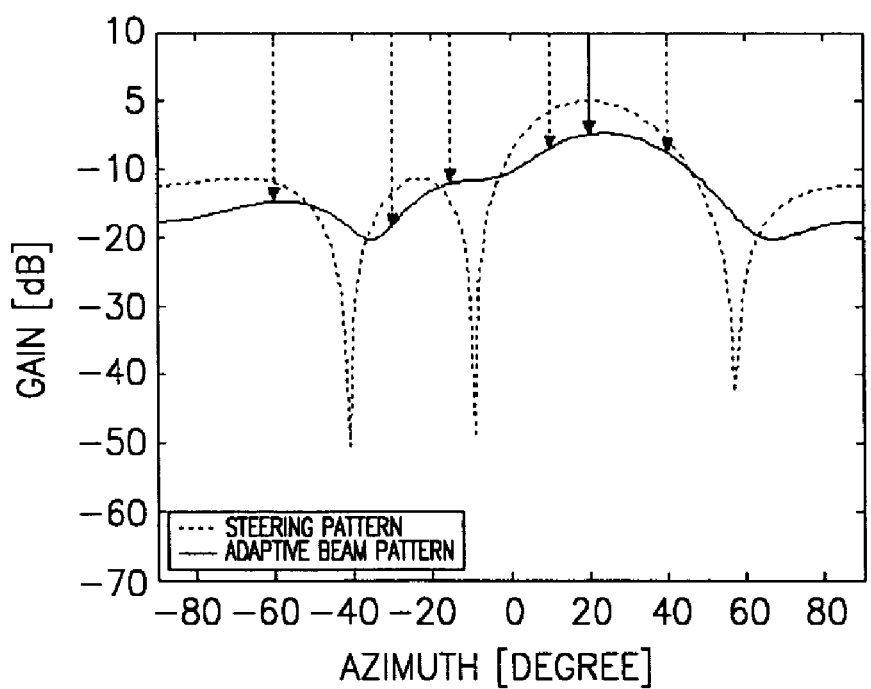
Figure 4C:
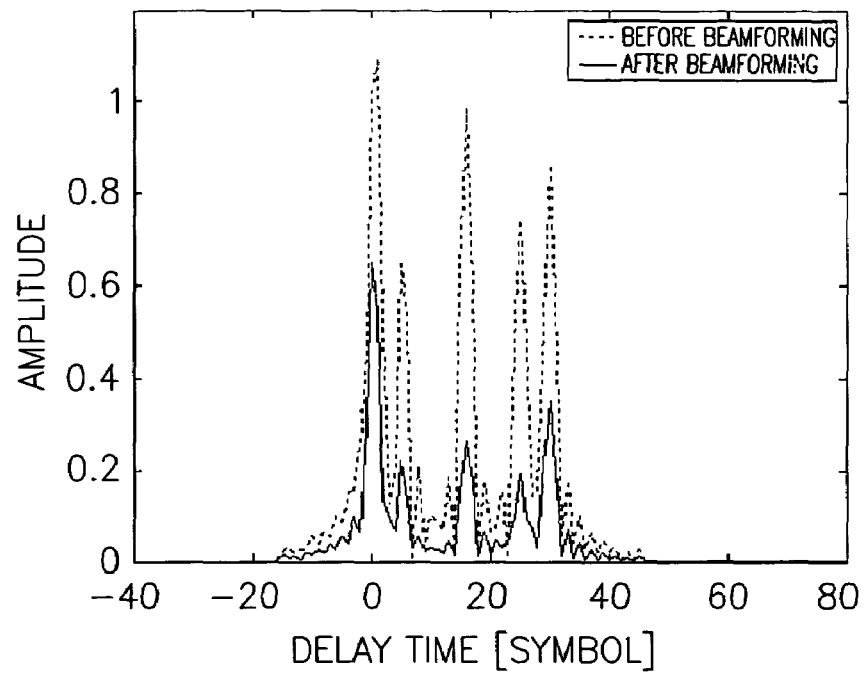
Figure 4D:
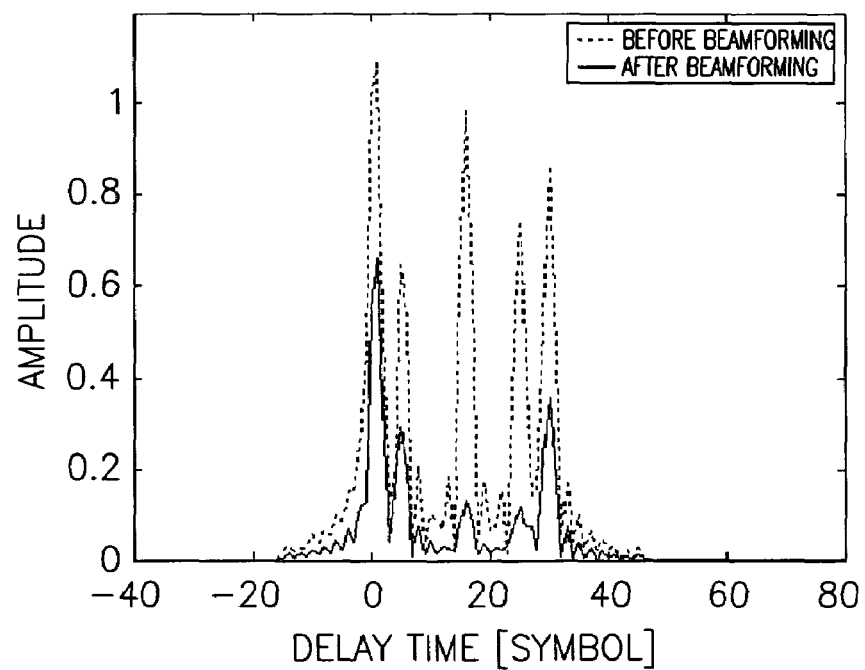
Figure 4E:
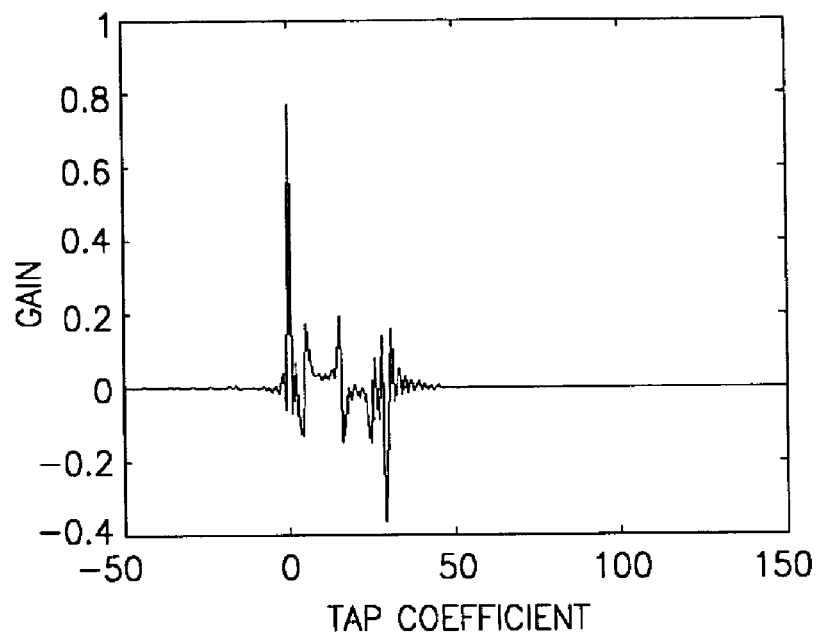
Figure 4F:
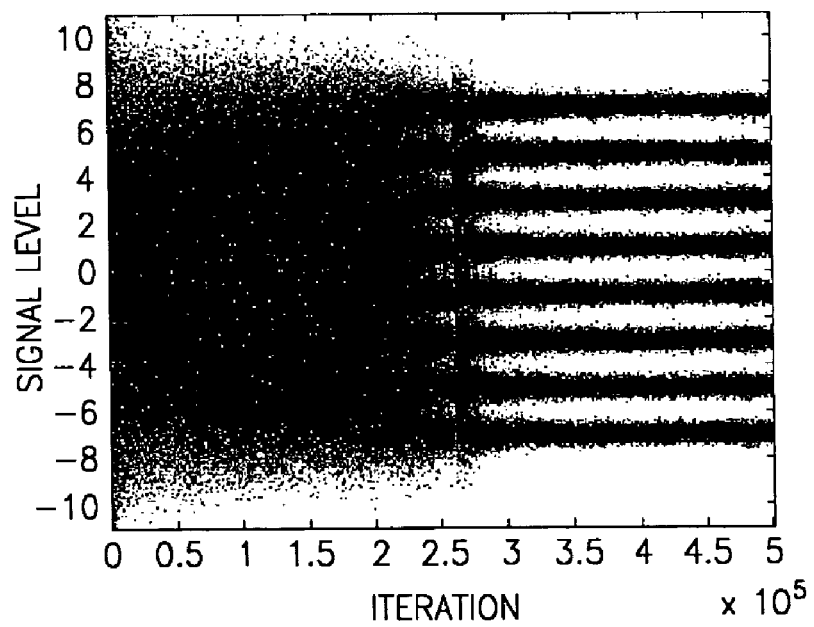

FIGS. 4A through 4F show characteristics of the Brazil C channel when using space diversity according to an exemplary embodiment of the present invention. FIG. 4A illustrates a beam pattern of the first beam-former 14-1. Given the adaptive beam pattern according to the present invention, the beam pattern of the first beam-former 14-1 is oriented to an azimuth of (−15°), shown by the bold arrow. FIG. 4B illustrates a beam pattern of the second beam-former 14-2. Given the adaptive beam pattern according to the present invention, the beam pattern of the second beam-former 14-2 is oriented to an azimuth of (20°), shown by the bold arrow. FIG. 4C shows a response characteristic of the first beam-former 14-1. Referring to FIG. 4C, the amplitude after beam-forming (represented by a solid line) is less than the amplitude before beam-forming (represented by a dotted line). FIG. 4D shows a response characteristic of the second beam-former 14-2. Referring to FIGS. 4C and 4D, the amplitude of the main path signals decreases after beam-forming is performed, and all the multi-path signals are not removed. If the main path signals and the multi-path signals are combined, the amplitude of the main path signal will increase and the number of multi-path signals increases. However, since the amplitude of the main path signals increases and the amplitude of residual multi-path signals are small, the equalizer 28 can easily remove the multi-path signals. FIG. 4E shows the relationship among tap coefficients and a gain of the equalizer 28 after convergence. FIG. 4F shows an output property of the equalizer 28 by plotting signal level versus iterations. Referring to FIG. 4F, the convergence speed of the equalizer 28 of the receiver 100 is approximately 300,000 symbols. Comparing FIGS. 3D and 4F, the convergence time of the equalizer 28 of the receiver 100 according to the present invention as illustrated by FIG. 4F is much smaller than the convergence time of the conventional receiver as illustrated by FIG. 3D.

Figure 5A:
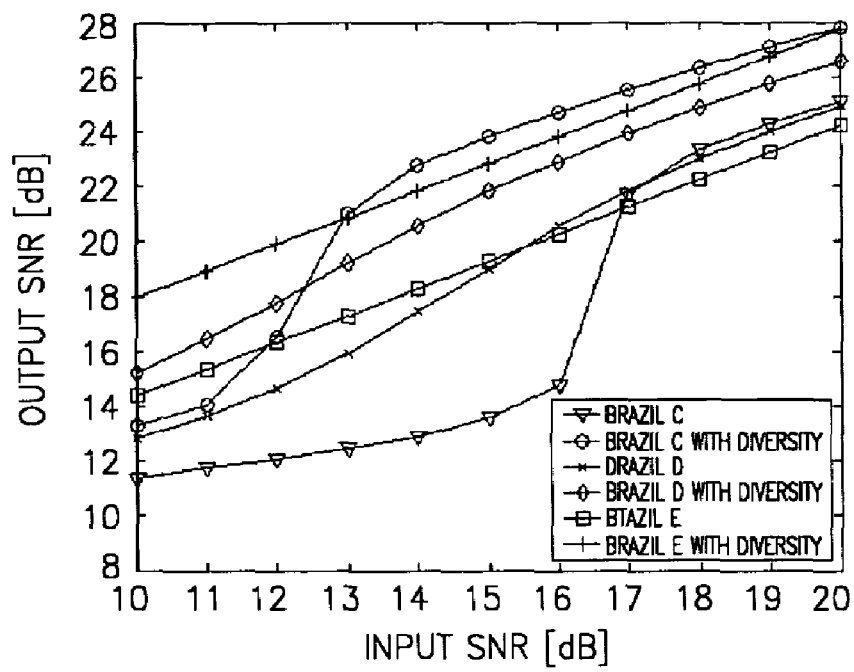
FIG. 5A includes an exemplary output signal-to-noise ratio with respect to an input signal-to-noise ratio of an equalizer.
Figure 5B:
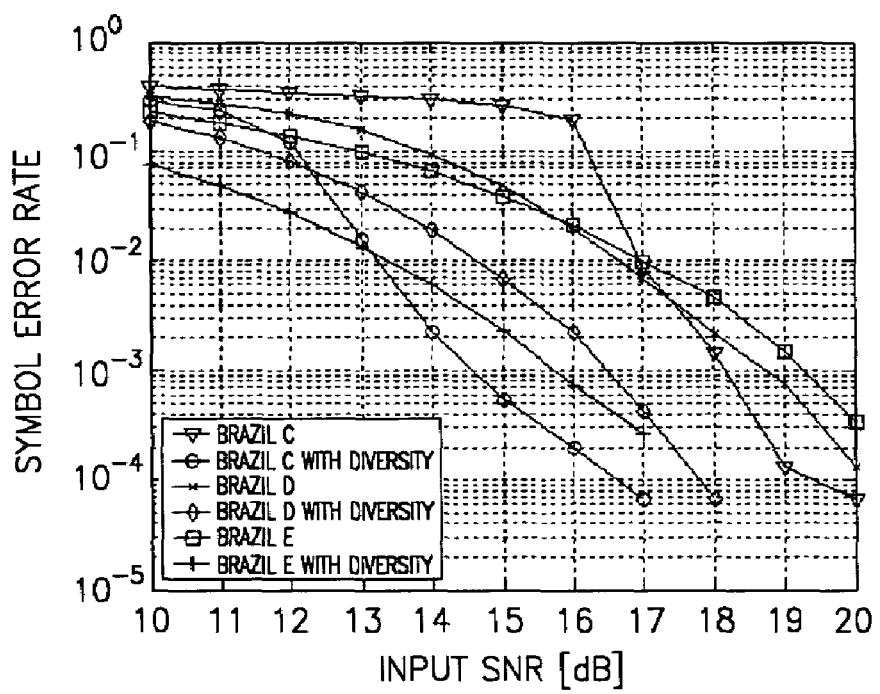
FIG. 5B is an exemplary symbol error rate with respect to the input signal-to-noise ratio in the equalizer.

FIG. 5A shows an output signal-to-noise ratio (SNR) with respect to an input SNR in an equalizer, and FIG. 5B shows a symbol error rate with respect to the input SNR in an equalizer. Referring to FIGS. 5A and 5B, the SNR in the Brazil C channel is much higher when using space diversity according to an exemplary embodiment of the present invention.

When using the Brazil C channel, since multi-path signals having similar amplitudes as the main path signal when received by the antenna array 10, within a short delay time, the main beam amplitude is reduced as a whole to remove the multi-path signals. As a result, the amplitude of the main path signal is also considerably reduced. Here, the equalizer 28 of the receiver 100 according to an exemplary embodiment of the present invention, may compensate for the reduced amplitude of the main path signal by using space diversity, thereby quickly compensating for channel distortion.

Accordingly, as described above, receiving digital TV signals, at a receiver providing a fast convergence speed and reduction in the burden of channel compensation will result in faster signal reception.

While the present invention has been particularly shown and described with reference to an exemplary embodiment thereof, it will be understood by those of ordinary skill in the art that various changes in form and details may be made therein without departing from the spirit and scope of the invention as defined by the following claims.

What is claimed is:

1. A method of receiving digital television (TV) signals, the method comprising:
   receiving a plurality of incident data signals at a plurality of antennas;
   demodulating the incident data signals;
   estimating a channel for at least one of the antennas in response to the demodulated incident data signals;
   selecting a main path signal from among the demodulated incident data signals and performing beam-forming on the selected main path signal; and
   combining the beam-formed selected main path signal with the demodulated incident data signals to form an output signal.

2. The method of claim 1, further comprising:
   removing at least one multi-path signal included in the combined output signal.

3. The method of claim 1, wherein one of the incident data signals includes the main path signal and a plurality of multi-path signals.

4. The method of claim 1, wherein estimating a channel is performed based on an output signal of at least one beam-former.

5. The method of claim 1, wherein estimating a channel is performed using a field synchronization signal of a data frame contained in each of the demodulated incident data signals.

6. The method of claim 1, wherein the main path signal is selected as a result of comparing at least one level of the demodulated incident data signals with a reference level.

7. The method of claim 1, wherein beam-forming is performed based on a field synchronization signal of a data frame of the selected main path signal.

8. The method of claim 1, wherein beam-forming is performed using a training sequence.

9. The method of claim 1, wherein combining the beam-formed selected main path signal with the demodulated incident data signals comprises:
   delaying at least one demodulated incident data signal by a corresponding delay time; and
   combining the delayed at least one demodulated incident data signal with the beam-formed selected main path signal.

10. The method of claim 1, wherein the beam-formed selected main path signal and the demodulated incident data signals are combined using at least one of selective combining, maximal ratio combining, equal gain combining, and feedback combining.

11. A method of receiving radio signals, the method comprising:
    receiving incident data signals using space diversity;
    demodulating the incident data signals;
    estimating a channel for each of a plurality of beam-formers using the demodulated incident data signals and output signals of the plurality of beam-formers;
    selecting a main path signal from among the demodulated incident data signals, applying a weight to the selected main path signal, and performing beam-forming on the selected main path signal; and
    delaying each of the output signals of the plurality of beam-formers by a delay time and combining the delayed output signals.

12. A receiver including a plurality of beam-formers, the receiver comprising:
    a plurality of converters, each of which converts radio signals, received through a corresponding plurality of antennas, into baseband signals;
    a channel estimator, which receives output signals of the plurality of converters and output signals of the plurality of beam-formers, estimates a channel for each of the corresponding plurality of antennas, and outputs control signals;
    at least one controller, which receives the output signals of the plurality of beam-formers, delays each of the output signals of the plurality of beam-formers by a delay time in response to a corresponding control signal, and outputs the delayed output signals; and
    an adder, which combines the output signals of the at least one controller.

13. The receiver of claim 12, wherein the channel estimator estimates the channel using a field synchronization signal of a data frame contained in each of the output signals of the plurality of beam-formers and the output signals of the plurality of converters.

14. The receiver of claim 12, further comprising:
    an equalizer, which receives an output signal of the adder and removes multi-path signals to form equalized radio signals.

15. The receiver of claim 14, wherein the equalizer removes the multi-path signals during a payload data period of a data frame contained in each of the radio signals.

16. The receiver of claim 12, wherein each of the plurality of beam-formers comprises:
    a storing circuit, which stores weights;
    an adder, which sums output signals of the storing circuit;
    a memory device, which stores a training sequence;
    a subtractor, which calculates a difference between the training sequence output from the memory device and an output signal of the adder; and
    an adaptive weight controller, which independently controls each of the weights in response to an output signal of the subtractor.

17. The receiver of claim 12, wherein each of the plurality of beam-formers performs beam-forming in response to a field synchronization signal of a data frame contained in each of the radio signals.

18. A receiver for receiving radio signals, the receiver comprising:
    a converter, which converts the radio signals received through an antenna array into baseband signals and outputs the baseband signals;
    a plurality of beam-formers, each of which receives the baseband signals of the converter and output signals based on the received baseband signals;
    a channel estimator, which receives the output baseband signals of the converter and the output signals of each of the plurality of beam-formers and estimates a channel for each of the radio signals;
    a control circuit, which receives the output signals of each of the plurality of beam-formers and independently controls a delay time of each of the output signals of the plurality of beam-formers based on channel estimation results of the channel estimator; and
    an adder, which combines output signals of the control circuit.

19. The receiver of claim 18, further comprising:
    an equalizer, which receives an output signal of the adder and removes multi-path signals to form equalized radio signals.

20. A receiver, comprising:
    a plurality of beam-formers, each of which performs beam-forming on a main path signal selected from a plurality of demodulated incident signals received and sent through an estimated channel; and an equalizer that removes multi-path signals from the received demodulated incident signals;

wherein each of the plurality of beam-formers performs beam-forming in response to a field synchronization signal of a data frame of the selected main path signal, and wherein the equalizer removes the multi-path signals during a payload data period of a data frame contained in each of the multi-path signals.

21. An apparatus, comprising:

a plurality of beam-forming devices, wherein each beam-forming device is configured to receive a plurality of demodulated incident data signals, to select a main path signal having a better channel characteristic from among the plurality of demodulated incident data signals, and to perform beam-forming on the selected main path signal; and a plurality of controllers that receive output signals of the plurality of beam-forming devices, wherein each of the controllers controls a delay time, a gain, or the delay time and the gain for a respective output signal in response to a corresponding control signal.

22. An apparatus, comprising:

a channel estimator device configured to receive a plurality of demodulated incident data signals from a plurality of antennas and at least one output signal from at least one beam-forming device, to estimate a channel for at least one of the plurality of antennas, and to send a control signal to a control circuit coupled to the at least one beam-forming device;

wherein the control signal includes at least one of timing and gain information.

23. An apparatus, comprising:

a channel estimator device configured to receive a plurality of demodulated incident data signals from a plurality of antennas and at least one output signal from at least one beam-forming device, to estimate a channel for at least one of the plurality of antennas, and to send a control signal to a control circuit coupled to the at least one beam-forming device;

wherein the control signal includes at least one of timing and gain information, and wherein the at least one beam-forming device is configured to receive the plurality of demodulated incident data signals, to select a main path signal having a better channel characteristic from among the plurality of demodulated incident data signals, and to perform beam-forming on the selected main path signal.

* * * * *